United States Patent [19]

Eppler

[11] 4,025,998

[45] May 31, 1977

[54] WIRE SLITTING AND INSTALLING APPARATUS

[75] Inventor: Daniel Eppler, Old Bridge, N.J.

[73] Assignee: Thomas & Betts Corporation, Elizabeth, N.J.

[22] Filed: Feb. 3, 1976

[21] Appl. No.: 654,895

[52] U.S. Cl. .............................. 29/566.4; 29/745; 29/758; 30/90.8
[51] Int. Cl.² .................. H01T 43/00; H01T 43/04
[58] Field of Search ......... 29/203 H, 203 D, 203 C; 30/90.4, 90.8, 91.1, 91.2

[56] References Cited

UNITED STATES PATENTS

| | | | |
|---|---|---|---|
| 2,974,414 | 3/1961 | Bozeman | 30/90.4 |
| 3,406,558 | 10/1968 | Tillmann et al. | 29/203 H |
| 3,494,171 | 2/1970 | Rapp | 29/203 H |
| 3,571,888 | 3/1971 | Di Filippo | 29/203 H |
| 3,611,782 | 10/1971 | Eppler | 29/203 H |
| 3,710,610 | 1/1973 | McCaughey | 29/203 H |
| 3,732,718 | 5/1973 | Barberio | 29/203 H |
| 3,846,894 | 11/1974 | Parsons | 29/203 H |
| 3,903,725 | 9/1975 | Rommel | 29/203 H |

FOREIGN PATENTS OR APPLICATIONS 1,294,093   10/1972   United Kingdom ............. 29/203 D

*Primary Examiner*—James L. Jones, Jr.
*Assistant Examiner*—J. T. Zatarga
*Attorney, Agent, or Firm*—David Teschner; Jesse Woldman

[57] ABSTRACT

Apparatus for slitting a sheathed three-conductor cable having two outer conductors and a central ground conductor preparatory to installing the slit segment into a specially prepared electrical fixture comprises a slitting assembly reciprocatingly slidable towards and away from a cradle member arranged to support and align a given length of the cable for engagement with a pair of spaced blade members affixed to the slitting assembly. The sheath of the cable is slit on either side of the central ground conductor, one of the outer conductors being displaced out of the plane of the conductors while the other outer conductor is displaced laterally away from the central conductor. The slit portion of the cable is thus suitably arranged for installation in a specially prepared electrical fixture which may be placed between extending portions of the jaw members of a further embodiment of the invention to complete the installation.

27 Claims, 13 Drawing Figures

WIRE SLITTING AND INSTALLING APPARATUS

BACKGROUND OF THE INVENTION:

1. Field of the Invention:

The invention is directed to the field of tools and principally to apparatus and a combination tool for slitting sheathed three-conductor cable and installing same in a specially prepared electrical fixture.

2. Description of the Prior Art:

In my copending applications Ser. Nos. 567,515, 567,540, and 567,688, all filed on Apr. 14, 1975 as divisional cases divided out of application Ser. No. 512,414 filed on Oct. 7, 1974 for Electrical Receptacle, and all assigned to the assignee of the instant invention, there is shown and described an insulated electrical receptacle and various embodiments thereof which include a two-part assembly comprising a box and cover portion, the box portion containing insulation piercing contact elements arranged to penetrate the insulation and engage the conductive portion of a slit segment of sheathed two or three conductor electrical cable in which the individually insulated conductors are initially arranged in a common plane within an outer insulative sheath, the cable being commonly employed as electrical wiring for building structures and the like. Preparation of the cable for installation in such fixtures has heretofore generally been accomplished by carefully slitting the outer sheath with a pocket knife or other similar convenient tool to avoid nicking or damaging the insulative covering surrounding each wire. The sheath is thereafter removed or folded back to provide access to the inner conductors which are then suitably spread apart for insertion into the specially prepared electrical fixture. The manner in which the installation of the cable into the receptacle is accomplished is fully described in the above noted applications. Briefly, however, the slit and preformed portion of the cable is suitably positioned in the cover portion of the receptacle and the cover and cable thereafter suitably positioned over the exposed opening in the box portion of the device. The box and cover are then forcibly urged together causing the conductors to be engaged by the specially configured contacts within the box portion to establish a secure and reliable electrical connection therebetween. A significant portion of the time and labor required to complete such a connection results from the relatively tedious and time consuming operation required to manually slit the sheath and preform the conductors for insertion in the fixture in accordance with the above described prior art method. A prior art device designed to accomplish the slitting and forming operation is disclosed in U.S. Pat. No. 3,846,894 issued to Parsons et al on Nov. 17, 1974. This device, however, employs a pair of totally exposed slicing blades which are affixed to a handle member and rotated into slicing position by actuation of the handle. The exposed blades are provided with sharp slicing edges which may readily cause injury to an operator during the course of use of the tool. The direct pivotal coupling between the handle and the slicing blades also results in a less than optimum force applying arrangement resulting in the necessity for exerting a rather large force to accomplish the slicing and forming operation.

SUMMARY OF THE INVENTION

The present invention overcomes the limitations and difficulties noted above with respect to prior art devices by providing a slitting and forming apparatus and installing tool for three-conductor sheathed electrical cable that is more reliable, convenient, versatile, and safer than such prior art devices. The slitting and forming apparatus comprises a slitting assembly slidably coupled to a cradling means wherein the two parts may be coupled to a suitable drive means arranged to linearly drive the two parts towards and away from one another in a reciprocating movement. The slitting assembly includes a pair of selectively spaced blade members attached to a support member which, in one embodiment, includes a pair of spaced bearing holes for slidably receiving a pair of rods attached to and extending from the cradling means. The cradling means comprises a centrally located anvil portion and upturned end portions for aligning and supporting a given length of the three-conductor sheathed cable therewithin. The anvil portion includes a web-like element extending the length of the cradling means for supporting the central ground conductor of the cable and is flanked by a recessed portion along one side thereof arranged to receive one of the outer conductors which is displaced out of the plane of the remainder of the cable by a shoulder portion of the slitting assembly blade support after the blades have slit the outer sheath of the cable. Strut means located adjacent the opposite side of the web-like anvil portion serve to direct the other outer conductor laterally away from the central conductor so that the resulting configuration comprises the central conductor and one outer conductor lying in the original plane of the cable but selectively separated from one another, with the opposing outer conductor being selectively displaced out of the original plane of the cable so that the three conductors, in transverse section, define a substantially L-shaped configuration. This arrangement permits the user to axially roll the slit and preformed cable segment into the specially designed cover portion of the above described electrical receptacle, which cover portion and cable segment is then joined to the box portion of the receptacle by suitable means to complete the connection between the cable and the specially designed contact means located within the box portion. Although the slitting assembly and cradling means may be coupled to any suitable reciprocating drive means to move these parts between a first or loading position preparatory to the slitting and forming operation and a second or closed position in which the blade members are caused to move linearly towards and straddle the anvil portion of the cradling means, a further embodiment of the invention includes a substantially U-shaped frame member having one movable and one stationary jaw member, each of the jaw members having a flanged edge for slidably receiving the inturned fingers which may be provided on both the slitting assembly and cradling means which may thus be coupled to the jaw members. Relative movement between the slitting assembly and the cradling means may then be accomplished by providing means such as a handle member coupled between the movable jaw member and the frame member and pivotable about a movable link member providing a fulcrum located so as to provide a relatively large mechanical advantage thereat. The jaw members may each be provided with extending platform portions arranged to receive the specially designed electrical receptacle or fixture therebetween. Thus, the slit and preformed cable segment may be placed in the cover portion, the cover and box portions placed within the platform portions of the jaw members, and the jaw members activated by the handle means to press the cover and box portions together thereby completing the internal electrical connections between the conductors of the cable and the respective contact members in the box portion of the electrical receptacle. Guiding means in the form of one or more guide rails located within the yoke portion of the frame member may be advantageously employed to properly orient and guide the movable jaw member with respect to the fixed jaw member along its path of travel. As a result of the instant design, the exposure of the slitting edges of the blade members is substantially minimized so that manipulation and use of the instant apparatus may be accomplished in a relatively safe, convenient, and speedy manner. It is therefore an object of this invention to provide a rapid, efficient, safe, and versatile means for preparing a sheathed three-conductor cable for installation in a specially prepared electrical fixture.

It is another object of this invention to provide an improved slitting and forming apparatus for sheathed three-conductor cable having two outer conductors and a central ground conductor.

It is a further object of this invention to provide a combination tool for slitting and forming a given segment of sheathed three-conductor cable and installing the slit and formed segment in a specially prepared electrical fixture.

It is still another object of this invention to minimize the time and effort required to slit and prepare a sheathed three-conductor cable for installation in a specially prepared electrical fixture.

It is yet a further object of this invention to provide a means for accurately preforming a given segment of a three-conductor cable.

It is still a further object of this invention to provide a combination tool of modular construction for slitting and preforming a given segment of sheathed three-conductor cable and installing the segment in a specially prepared electrical fixture.

It is yet another object of this invention to provide a self-aligning apparatus for slitting and preforming a given segment of sheathed three-conductor cable for installation in a specially prepared electrical fixture.

It is still a further object of this invention to provide a modular slitting and preforming apparatus for sheathed three-conductor cable, which apparatus may be operatively coupled to a tool for installing the slit and preformed segment of cable into a specially prepared electrical fixture.

It is yet a further object of this invention to provide a reversible modular slitting and preforming apparatus for sheathed three-conductor cable, which apparatus may be operatively coupled to a tool for installing the slit and preformed segment of cable into a specially prepared electrical fixture.

It is still a further object of this invention to provide a means for slitting the outer sheath of a three-conductor sheathed cable having two outer conductors and a central ground conductor, and displacing the two outer conductors along different planes to establish an L-shaped configuration in transverse section.

Other objects and features of the invention will be pointed out in the following description and claims and illustrated in the accompanying drawings which disclose, by way of example, the principle of the invention and the best mode contemplated for carrying it out.

BRIEF DESCRIPTION OF THE DRAWINGS

In the Drawings:

FIG. 3 is a fragmentary front elevational view showing the slitting and forming apparatus of the device of FIG. 1.

Similar elements are given similar reference characters in each of the respective drawings.

DESCRIPTION OF THE PREFERRED EMBODIMENTS

Figure 1:
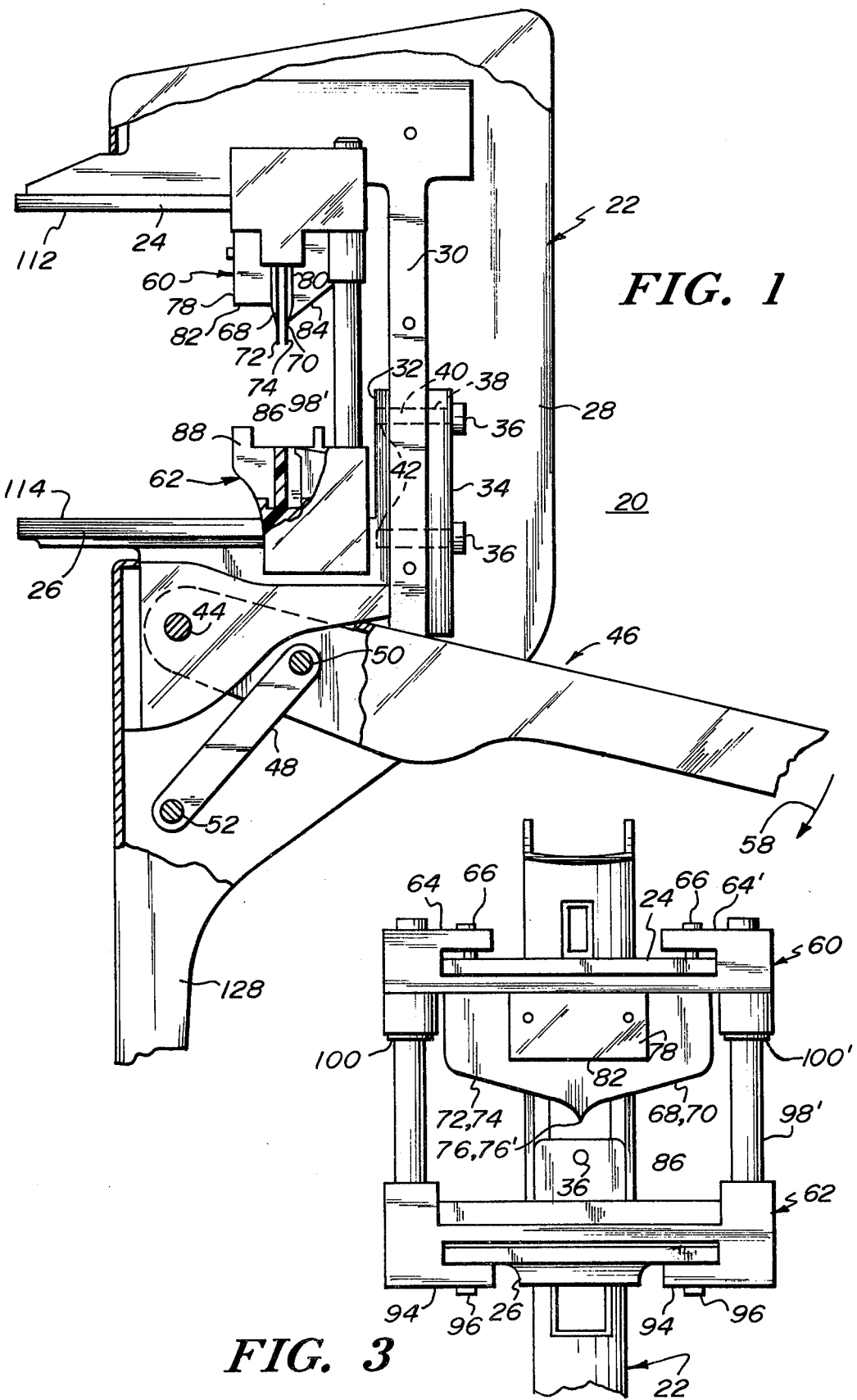
FIG. 1 is a fragmentary side elevational view, partly cut away and partly in section, showing a combination slitting, forming and installing tool constructed in accordance with the concepts of the invention.
Figure 2:
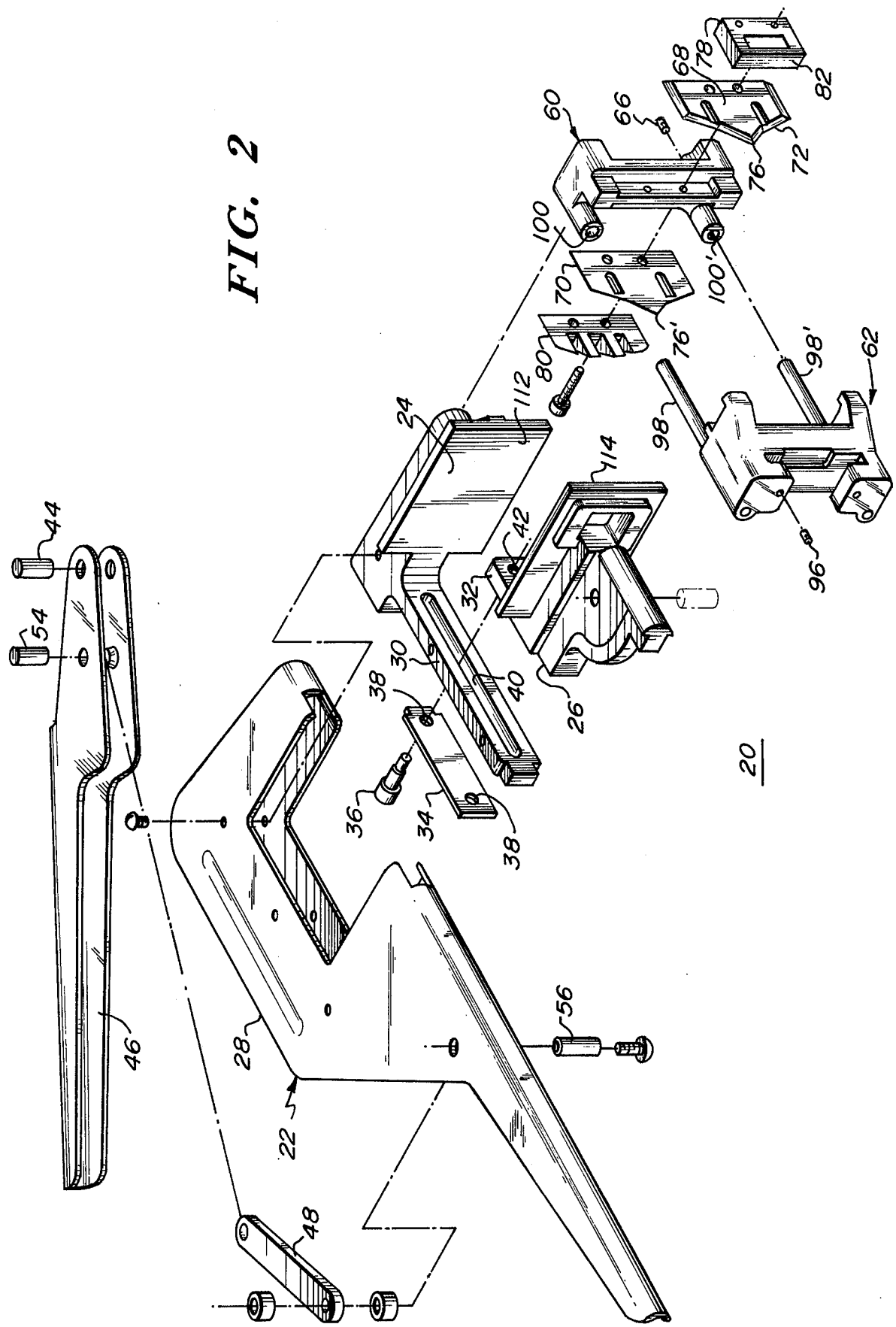
FIG. 2 is an exploded perspective view of the device of FIG. 1.
Figure 4:
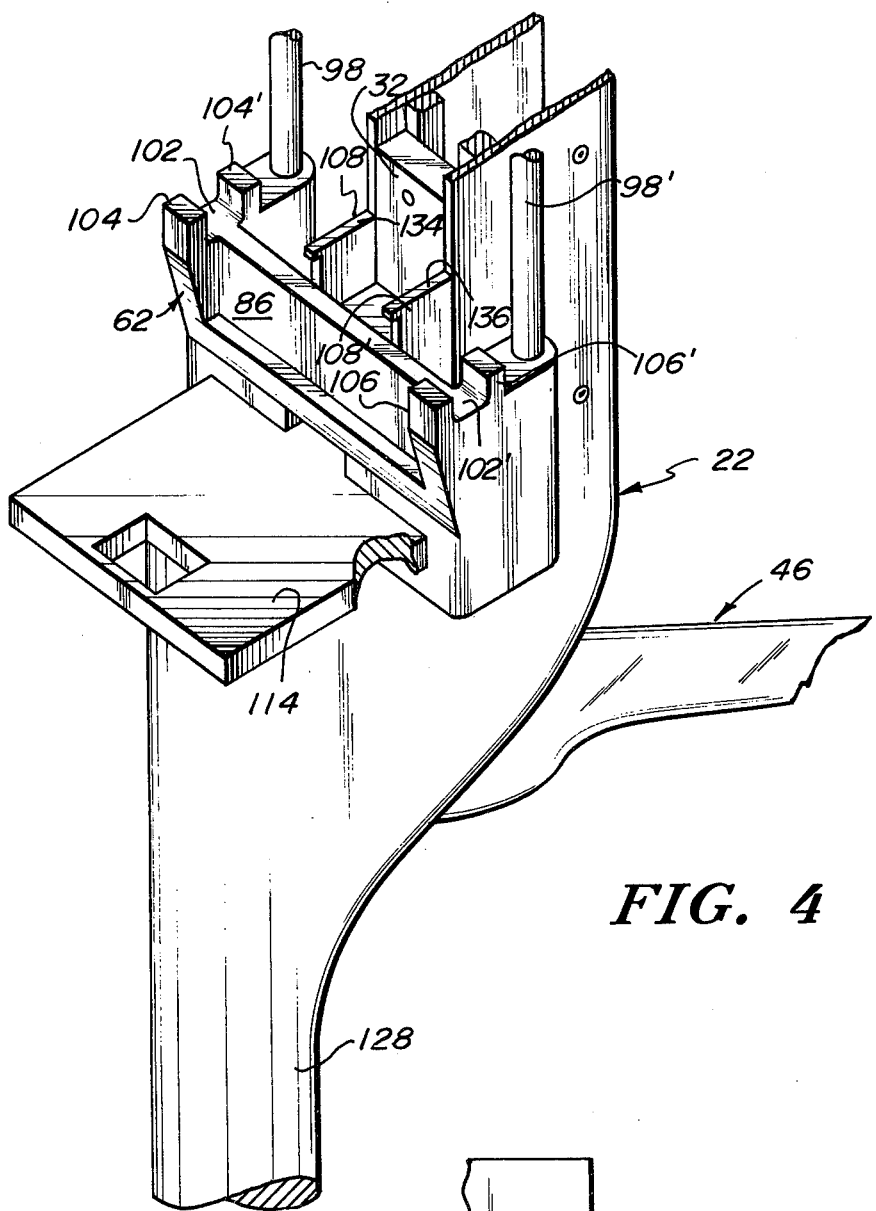
FIG. 4 is a fragmentary perspective view, partly cut away and partly in section, of a portion of the device of FIG. 1.
Figure 5:
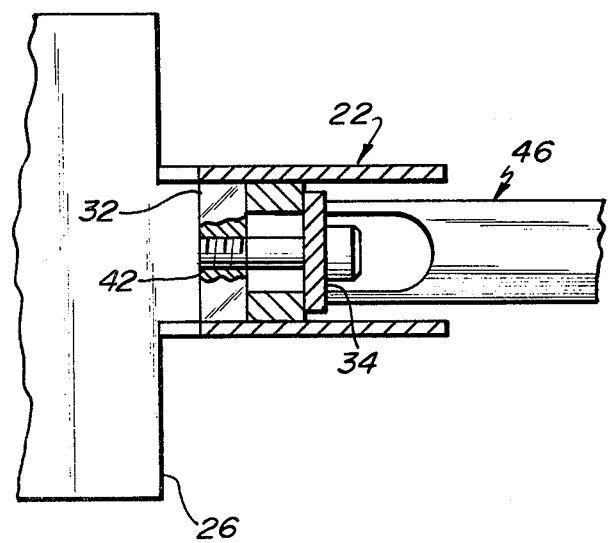
FIG. 5 is a fragmentary top elevational view, partly in section, showing the guide means of the device of FIG. 1.
Figure 6:
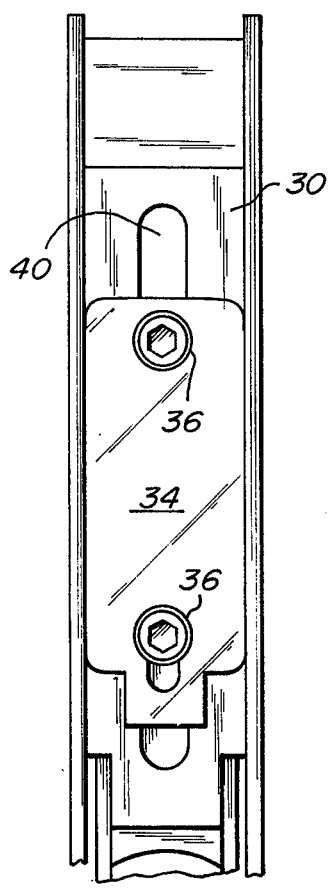
FIG. 6 is a fragmentary rear elevational view showing further details of the guide means of the device of FIG. 1.
Figure 7:
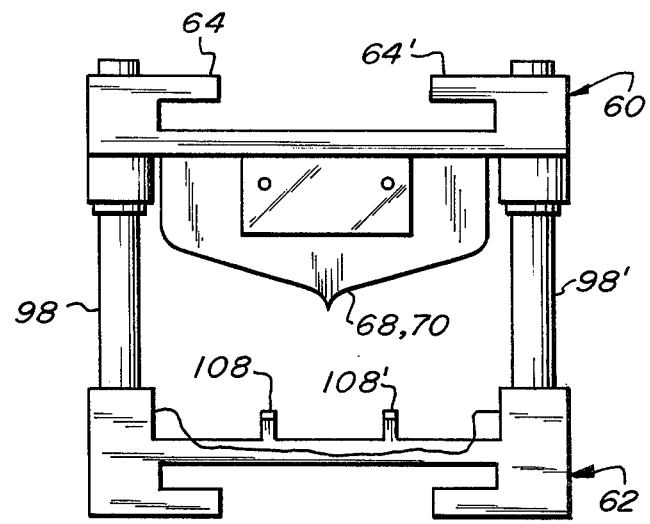
FIG. 7 is a front elevational view, partly cut away, of a slitting and forming apparatus constructed in accordance with the concepts of the invention.
Figure 8:
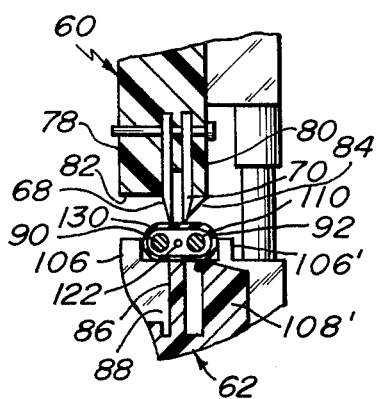
FIG. 8 is an enlarged fragmentary side elevational view, partly in section, showing further details of the device of FIG. 7.
Figure 9:
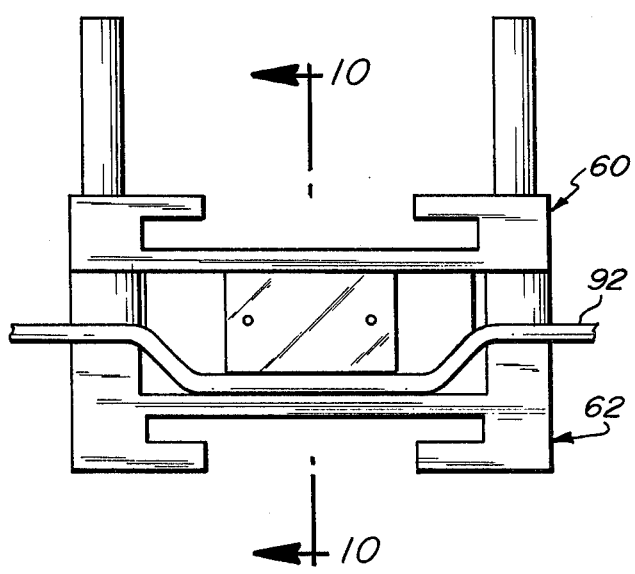
FIG. 9 is a front elevational view of the device of FIG. 7 in an advanced state of operation.
Figure 10:
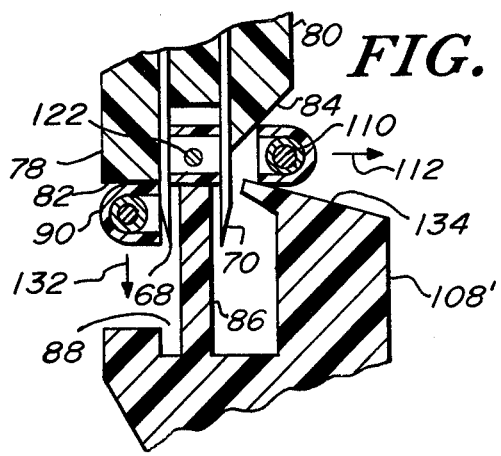
FIG. 10 is an enlarged fragmentray side elevational view, in section, taken along the line 10—10 of FIG. 9.
Figure 11:
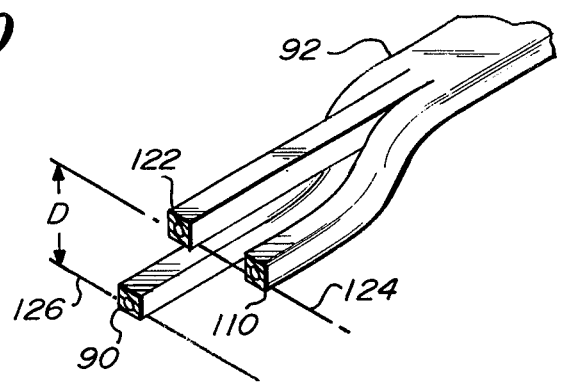
FIG. 11 is a fragmentary perspective view, partly in section, showing the configuration of an end portion of a sheathed three-conductor cable slit and preformed by the apparatus of FIG. 7.
Figure 12:
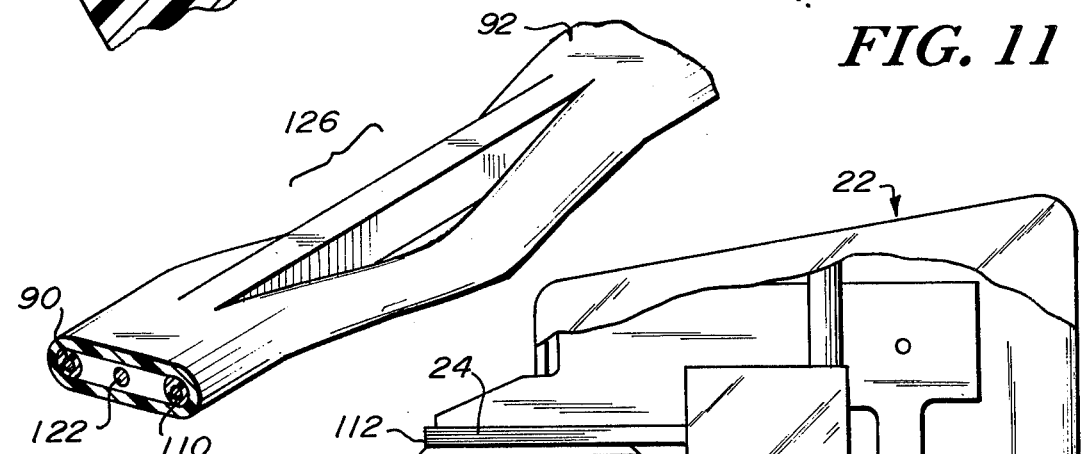
FIG. 12 is a fragmentary perspective view, partly in section, showing the configuration of a mid-span portion of a sheathed three-conductor cable slit and preformed by the apparatus of FIG. 7.
Figure 13:
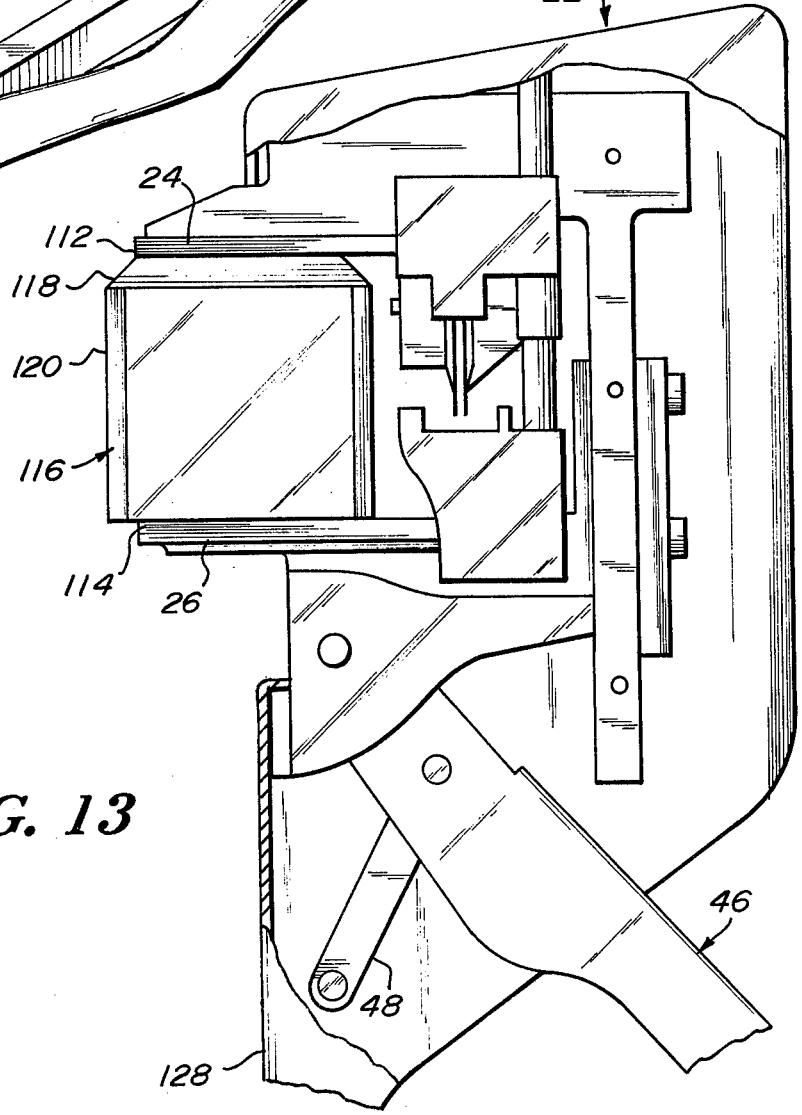
FIG. 13 is a fragmentary side elevational view, partly cut away and partly in section, of the device of FIG. 1 showing the employment thereof for installing a slit and preformed segment of sheathed three-conductor cable in a specially prepared electrical fixture.

Referring now to FIGS. 1 through 10, and FIG. 13, there is shown a combination tool 20 constructed in accordance with the concepts of the invention and including a frame member 22 having a fixed upper jaw member 24, a movable lower jaw member 26, and a yoke portion 28 interconnecting the upper and lower jaw members 24 and 26. Located within the yoke portion 28 is a guide means shown as an elongate slotted rail member 30 which, for the sake of manufacturing convenience, is illustrated as integral with and extending from the upper jaw member 24. The rail member 30 is arranged to guide the movable lower jaw member 26 along its path of travel through a slidable coupling including an extension 32 coupled to the lower jaw member 26, which extension 32 is held against the rail member 30 by an assembly which, as shown in detail in FIGS. 5 and 6, includes a backing plate 34 coupled to the extension 32 by fasteners 36 which extend through suitable apertures 38 (FIG. 2) in the backing plate 34, through an elongate slot 40 in the rail member 34, and engage receiving apertures 42 in the lower jaw member extension 32. Pivotingly coupled to the lower jaw member 26 through a pin 44 is a handle member 46. The handle member 46 is movably coupled to the frame member 22 by way of a pivoting link member 48 which is attached at one end to the handle member 46, as at 50, and at its other end to the frame member 22, as at 52. A bearing pin 54 (FIG. 2) is shown as coupling the link member 48 to the handle member 46 at 50, and a bearing pin 56 (FIG. 2) is shown as coupling the link member 48 to the frame member 22 at 52. As the handle member 46 is moved downwardly, as viewed in FIG. 1, in a direction indicated by the arrow 58, the link member 48 provides a fulcrum therefore at 50 and is caused to rotate about the pin 56 in a counterclockwise direction, as viewed in FIG. 1. Consequently, the lower jaw member 26 is driven upwardly, as viewed in FIG. 1, through the coupling established between the lower jaw member 26 and the handle member 46 by the pin 44, the force applied thereto being optimized by the mechanical arrangement employed therewith. Coupled between the upper and lower jaw members 24 and 26, respectively, is a cable slitting and forming apparatus including a slitting assembly 60 and a cradling means 62. The slitting assembly 60 is coupled to the upper jaw member 24 by way of a pair of inturned finger portions 64, 64' (FIG. 3) arranged to slide over and grasp the opposing edges of the upper jaw member 24. A fastener 66 which may comprise a threaded screw or the like extending through a respective finger portion 64, 64' may be employed to lock the slitting assembly 60 to the upper jaw member 24. The slitting assembly 60 includes a pair of spaced blade members 68, 70, each symmetrically shaped and having a generally V-shaped sharpened slitting edge 72, 74 (FIG. 2) respectively, extending to either side of a centrally located piercing point 76, 76' respectively at the apex thereof. A first support element 78 provides a support for the blade member 68 while a second support element 80 provides a similar support for the blade member 70. The support element 78 comprises a lower bearing surface 82 which extends outwardly normal to the planes of the blade members 68 and 70 to provide a shoulder portion for displacing one of the outer conductors of a sheathed three-conductor cable out of the plane of the cable in a manner to be described in greater detail hereafter. The support element 80 comprises an inclined or tapered surface 84 (FIG. 1) extending obliquely away from the side surface of the blade member 70. The purpose of surface 84 will be described more fully hereafter. The cradling means 62 is employed to retain a given segment of sheathed three-conductor cable in proper orientation and alignment with respect to the blade members 68 and 70 of the slitting assembly 60 and includes a web-like anvil portion 86 extending substantially the length of the cradling means 62 for supporting the central conductor of a sheathed three-conductor cable. An opening or recessed portion 88 extending along one side of the anvil portion 86 for receiving one of the outer conductors 90 (FIG. 8) of a three-conductor sheathed cable 92 displaced out of the plane of the cable 92 by the bearing surface 82 in a manner shown more clearly in FIG. 10. The cradling means 62 also includes a pair of inturned finger portions 94, 94' (FIG. 3) similar to finger portions 64, 64' of the slitting assembly 60, for coupling the cradling means 62 to the lower jaw member 26 in a manner similar to that described above with respect to the coupling between the slitting assembly 60 and the upper jaw member 24. Fasteners such as 96 essentially duplicative of fasteners 66 provide a means for locking the cradling means 62 to the lower jaw member 26 in the desired position. As further illustrated in FIGS. 3 and 7, a pair of spaced elongate rods 98, 98' extend from the cradling means 62 for slidable engagement within a pair of similarly spaced bearing apertures 100, 100', respectively, in the slitting assembly 60, to provide a slidable coupling between the cradling means 62 and the slitting assembly 60. The rods 98 and 98' also serve to provide a convenient alignment means between the cradling means 62 and the slitting assembly 60 in the absence of alternative means such as the slide assembly comprising the rail member 30 and the lower jaw member extension 32 associated with the combination tool 20. For example, although the rods 98 and 98' may be eliminated in the embodiment of the invention illustrated in FIGS. 1 through 6, the slitting assembly 60 and cradling means 62 may be employed as a modular element in the form shown in FIG. 7 and conveniently attached to any suitable drive means such as the spaced jaws of a press (not shown) or the like wherein the rods 98, 98' provide an alignment means and slidable coupling for the slitting assembly 60 and the cradling means 62. The cradling means 62 further includes recessed end portions 102, 102' (FIG. 4) each aligned substantially normal to the longitudinal axis of the cradling means 62. Each of the recessed portions 102, 102' is flanked by opposing upstanding arm portions 104, 104' and 106, 106', respectively, thereby defining a selectively proportioned cradle for receiving the cable 92 therewithin in the manner shown in FIG. 8. A pair of strut means 108, 108' (FIG. 4) extend upwardly from the base of the cradling means 62 adjacent the anvil portion 86 and on the side opposite the recessed portion 88 for use in cooperation with the obliquely angled surface 84 of the blade support 80 to direct the other outer conductor 110 of the cable 90 planarly away from the central conductor 92 in a direction indicated by the arrow 112 in FIG. 10 during the forming operation. To increase the versatility of the tool 20, the slitting assembly 60 and the cradling means 62 are constructed so as to be reversibly positionable over the upper and lower jaw members 24 and 26. This is accomplished simply by dimensioning the spacing between the inturned fingers 64 and 64' and 94 and 94' so as to be substantially equal, and constructing the jaw members 24 and 26 so that their widths are substantially equal and equivalent to the slitted opening between the respective inturned fingers. Thus, the modular assembly shown in FIG. 7 may be placed over the jaw members 24 and 26 in either of two positions, that is, with the slitting assembly 60 in the uppermost position, as illustrated in FIG. 1, or in the reverse position with the cradling means 62 in the uppermost position (not shown). As further shown in FIG. 1, each of the jaw members 24 and 26 includes an extending platform portion 112, 114, respectively, forwardly of the space occupied by the slitting assembly 60 and the cradling means 62. The portions 112 and 114 are arranged to receive therebetween an electrical fixture such as 116 having a cover portion 118 and a box portion 120, in the manner shown in FIG. 13. The fixture 116 is specially constructed to receive the slit and formed segment of the cable 92 and provide an electrical connection between the conductors of the cable 92 and specially formed contact elements within the box portion 120 in the manner described in the above mentioned copending applications. A segment of the cable 92 had been slit and formed as shown in FIGS. 8, 9, and 10 into a configuration substantially as shown in FIG. 11 wherein the two outer conductors 90 and 110 flanking a central conductor 122 are displaced in such manner that the outer conductor 110 is displaced laterally away from the central conductor along the original plane of the cable 92 as indicated by the axis 124, while the other outer conductor 90 is displaced out of the original plane of the cable 92 a distance D as indicated between the axis 124 and a second axis 126, resulting in a final configuration essentially L-shaped in transverse section. Although FIG. 11 illustrates the preparation of the cable 92 being accomplished at an end portion thereof, mid-span preparation may be similarly accomplished as illustrated in FIG. 12. It will be understood that the relative positions of the three conductors 90, 110, and 122 within the slit and preformed segment included within the bracketed area 126 in FIG. 12 are essentially as shown in FIG. 11. The prepared segment of cable 92 is then placed within the cover portion 118 of the fixture 116 and the cover portion 118 suitably aligned with the box portion 120 of the fixture 116. The three part assembly is thus placed between the platform portions 112 and 114 in the manner shown in FIG. 13 and the handle means 46 activated in the direction shown by the arrow 58 in FIG. 1 to urge the lower jaw member 26 towards the upper jaw member 24, thus compressing the cover and box portions of the fixture 116 together and thereby completing the installation of the prepared segment of cable 92 within the fixture 116. It will of course be appreciated that the slitting assembly 60 and the cradling means 62 may be removed from the tool 20 and the tool 20 operated solely as an installation tool, where necessary or desirable, or, conversely, the extending platform portions 112 and 114 may be eliminated and the tool 20 operated solely as a slitting and forming device. As further illustrated in FIGS. 1 and 4, the frame member 22 may conveniently include a gripping portion 128 which is shaped preferably to fit comfortably within the user's hand. The gripping portion 128 may, of course, be located at any convenient point along the frame member 22, or the frame member may include additional gripping portions (not shown), if necessary or desirable.

Referring now specifically to FIGS. 8 and 9, the blade members 68 and 70 are arranged in parallel planar relationship and are selectively spaced from one another so as to pierce the outer sheath 130 of the cable 92 within the space between each of the outer conductors 90 and 110 and the central conductor 122. The slitting assembly 60 is aligned with the cradling means 62 so that the blade members 68 and 70 straddle the anvil portion 86 of the cradling means 62 during the completion of the operating stroke of the tool 20, as shown in FIG. 10. Thus, to effect the slitting and preforming of a given segment of the cable 92 the handle means 46 is initially displaced counterclockwise opposite to the arrow 58, as viewed in FIG. 1, to its uppermost position to fully separate the jaw members 24 and 26. The desired cable segment is then placed within the recessed portions 102 and 102' of the cradling means and planarly oriented as shown in FIG. 8. The handle means 46 is then moved in the direction indicated by the arrow 58 in FIG. 1 to drive the lower jaw member 26 linearly upwards towards the upper jaw member 24, causing the cradling means 62 and the contained segment of cable 92 to correspondingly move towards the slitting assembly 60. The piercing points 76, 76' of the blade members 68, 70 respectively, are thus caused to pierce the outer sheath 130 of the cable 92 and penetrate the interior thereof between the two outer conductors 90 and 110 and to either side of the central conductor 122 essentially as illustrated in FIG. 10. The sharpened slitting edges 72, 74 of the blade members 68 and 70, respectively, continue the incision and complete the slitting operation during a further portion of the stroke of the lower jaw member 26. As the operational stroke is continued, the bearing surface 82 of the support member 78 is caused to contact the slit segment of cable 92 containing the outer conductor 90 and displaces the conductor 90 out of the original plane of the cable 92 in a direction indicated by the arrow 132 in FIG. 10. At approximately the same time, the other outer conductor 110 is subjected to a laterally displacing force generated by the inclined surface 84 of the support member 80 and the upper ends 134 and 136 (FIG. 4) of the respective strut means 108 and 108', in a direction indicated generally by the arrow 112. The handle means 46 is then moved counterclockwise, as viewed in FIG. 1, to release the blade members 68 and 70 from engagement with the cable 92. The slit and preformed segment of the cable 92 may then be removed from the cradling means 62 and placed within the cover portion 118 of the fixture 116 for installation within the box portion 120 in the manner described above. It will further be noted that, during the operational stroke of the tool 20, the blade members 68 and 70 approach the cradling means 62 and the supported cable 92 along a direct linear path substantially perpendicular to the longitudinal axis of the cable 92 as it rests within the cradling means 62. The slitting edges 72 and 74 of the blade members 68 and 70, respectively, are thus caused to pierce and enter the cable 92 at the optimum angle of penetration, i.e., normal to the longitudinal axis of the cable 92, without exerting any displacing forces along the longitudinal axis of the cable 92, thereby insuring greater accuracy and stability during the slitting and preforming operation.

The embodiments of the invention in which an exclusive property or privilege is claimed are defined as follows:

1. Apparatus for slitting the insulating sheath of a sheated three-conductor cable having two outer conductors and a central conductor comprising: a slitting assembly including a pair of selectively spaced parallel blade members lying in respective planes substantially parallel to a first plane located between said blade members; means for cradling a given length of a sheathed three-conductor cable in a predetermined position along an axis parallel to said first plane and adjacent said blade members; means slidably coupling said slitting assembly to said cradling means for guiding said slitting assembly towards and away from said cradling means in relative linear movement along an axis substantially perpendicular to the axis of each given length of sheathed three-conductor cable; and means operatively coupled to said slitting assembly and said cradling means for moving said slitting assembly and said cradling means towards and away from one another; said slitting assembly including a first shoulder portion adjacent one of said blade members and a second shoulder portion adjacent the other of said blade members, said first shoulder portion having a bearing surface oriented substantially perpendicular to the planes of said blade members for displacing one of such outer conductors of such three-conductors cable in a direction out of the plane of such three-conductor cable upon the relative movement of said slitting assembly and said cradling means towards one another and the slitting of the sheath covering such three-conductor cable, said second shoulder portion having a bearing surface oriented at an oblique angle to the planes of said blade members for displacing the other of such outer conductors away from such central conductor in the plane of such three-conductor cable simultaneously with the displacement of the first mentioned outer conductor and the slitting of the sheath covering such three conductor cable; said cradling means including an anvil portion for supporting the central conductor of such three-conductor cable during such slitting operation, there being an elongate recessed portion extending along the length of and adjacent to said anvil portion for receiving the outer conductor which is displaced out of the plane of such three-conductor cable by said bearing surface of said first shoulder portion.

2. Apparatus as defined in claim 1 wherein said slitting assembly includes support elements for fixedly coupling said blade members to said slitting assembly.

3. Apparatus as defined in claim 1 wherein each of said blade members is symmetrically configured and comprises a slitting edge defined by a piercing point centrally located intermediate the ends of said slitting edge, said slitting edge extending contiguously from either side of said piercing point at a slight incline.

4. Apparatus as defined in claim 1 wherein said means slidably coupling said slitting assembly to said cradling means includes a pair of elongate rod-like members extending between said cradling means and said slitting assembly.

5. Apparatus as defined in claim 4 wherein said slitting assembly comprises bearing means for slidably receiving said elongate members therethrough.

6. Apparatus as defined in claim 1 wherein said cradling means comprises at least one strut means adjacent said anvil portion and opposite said elongate recessed portion for supporting one of such outer conductors of such three-conductor cable.

7. Apparatus as defined in claim 1 further comprising a frame member for supporting said cradling means and said slitting assembly, said frame member comprising an upper jaw member, a lower jaw member, and a yoke portion interconnecting said upper jaw member and said lower jaw member, one of said cradling means and said slitting assembly being removably coupled to said upper jaw member and the other of said cradling means and said slitting assembly being removably coupled to said lower jaw member.

8. Apparatus as defined in claim 7 wherein said means for moving said slitting assembly and said cradling means towards and away from one another comprises a handle means operatively coupled to said lower jaw member.

9. Apparatus as defined in claim 8 wherein said frame member further includes guide means coupled to said interconnecting portion, said lower jaw member being slidably coupled to said guide means for movement towards and away from said upper jaw member in response to the movement of said handle means.

10. Apparatus as defined in claim 8 further including a link member coupled between said handle means and said frame member to provide a fulcrum for said handle means.

11. Apparatus as defined in claim 7 wherein said frame member further includes a gripping portion for manually supporting said frame member.

12. Apparatus as defined in claim 7 wherein said cradling means is removably coupled to said lower jaw member and said slitting assembly is connected to said upper jaw member.

13. Apparatus as defined in claim 7 wherein said cradling means is removably coupled to said upper jaw member and said slitting assembly is removably coupled to said lower jaw member.

14. Apparatus as defined in claim 8 wherein said handle means is pivotally coupled to said lower jaw member.

15. Apparatus for slitting the insulating sheath of a sheathed three-conductor cable having two outer conductors and a central conductor, and for installing the slit cable in a specially prepared electrical fixture comprising, in combination: a frame member having an upper jaw member, a lower jaw member, and a yoke portion interconnecting said upper jaw member and said lower jaw member; one of said upper and said lower jaw members being linearly reciprocatingly movable towards and away from the other of said upper and said lower jaw members; a slitting assembly including a pair of selectively spaced parallel blade members lying in respective planes substantially parallel to a first plane located between said blade members, said slitting assembly being coupled to one of said upper and said lower jaw members; means for cradling a given length of a sheathed three-conductor cable in a predetermined position along an axis parallel to said first plane and adjacent said blade members, said cradling means being coupled to the other of said upper and said lower jaw members; means on said frame member cooperative with the movable one of said upper and said lower jaw members for guiding said movable one of said upper and said lower jaw members along the path of travel thereof; means operatively coupled to the movable one of said upper and said lower jaw members for moving said movable one of said upper and said lower jaw members towards and away from the other of said upper and said lower jaw members; and opposing platform portions each extending outwardly from a respective one of each of said upper and said lower jaw members for receiving such specially prepared electrical fixture therebetween, said platform portion being movable towards and away from one another in correspondence with said respective upper and lower jaw members, said slitting assembly including a first shoulder portion adjacent one of said blade members and a second shoulder portion adjacent the other of said blade members; said first shoulder portion having a bearing surface oriented substantially perpendicular to the planes of said blade members for displacing one of such outer conductors of such three-conductor cable in a direction out of the plane of such three-conductor cable upon the relative movement of said slitting assembly and said cradling means towards one another and the slitting of the sheath covering such three-conductor cable, said second shoulder portion having a bearing surface oriented at an oblique angle to the planes of said blade members for displacing the other of such outer conductors away from such central conductor in the plane of such three-conductor cable simultaneously with the displacement of the first mentioned outer conductor and the slitting of the sheath covering such three-conductor cable; said cradling means including an anvil portion for supporting the central conductor of such three-conductor cable during such slitting operation, there being an elongate recessed portion extending along the length of and adjacent to said anvil portion for receiving the outer conductor which is displaced out of the plane of such three-conductor cable by said bearing surface of said first shoulder portion.

16. Apparatus as defined in claim 15 wherein said means for moving said movable one of said upper and said lower jaw members comprises a handle means connected between said movable one of said upper and said lower jaw members and said frame member.

17. Apparatus as defined in claim 16 further comprising a link member coupled between said handle means and said frame member to provide a fulcrum for said handle means.

18. Apparatus as defined in claim 15 wherein said slitting assembly comprises inturned finger portions for slidable engagement with said upper jaw member.

19. Apparatus as defined in claim 15 wherein said cradling means comprises inturned finger portions for slidable engagement with said lower jaw member.

20. Apparatus as defined in claim 15 wherein said platform portions extend outwardly from said jaw members generally perpendicular to said first plane.

21. Apparatus as defined in claim 20 wherein said means for guiding said movable one of said upper and said lower jaw members comprises at least one rail member attached to said yoke portion of said frame member, said movable one of said upper and said lower jaw members having a leg portion slidably engaging said rail member along the path of travel of said movable one of said upper and said lower jaw members.

22. Apparatus as defined in claim 15 further comprising means directly slidably coupling said slitting assembly to said cradling means to provide additional alignment therebetween.

23. Apparatus for use in slitting the insulating sheath of a sheathed three-conductor cable having two outer conductors and a central conductor comprising: a slitting assembly including a pair of selectively spaced parallel blade members lying in respective planes substantially parallel to a first plane located between said blade members; means for cradling a given length of a sheathed three-conductor cable in a predetermined position along an axis parallel to said first plane and adjacent said blade members; and means slidably coupling said slitting assembly to said cradling means for guiding said slitting assembly towards and away from said cradling means in relative linear movement along an axis substantially perpendicular to the axis of such given length of sheathed three-conductor cable, said slitting assembly including a first shoulder portion adjacent one of said blade members and a second shoulder portion adjacent the other of said blade members, said first shoulder portion having a bearing surface oriented substantially perpendicular to the planes of said blade members for displacing one of such outer conductors of such three-conductor cable in a direction out of the plane of such three-conductor cable upon the relative movement of said slitting assembly and said cradling means towards one another and the slitting of the sheath covering such three-conductor cable, said second shoulder portion having a bearing surface oriented at an oblique angle to the planes of said blade members for displacing the other of such outer conductors away from such central conductor in the plane of such three-conductor cable simultaneously with the displacement of the first mentioned outer conductor and the slitting of the sheath covering such three-conductor cable; said cradling means including an anvil portion for supporting the central conductor of such three-conductor cable during such slitting operation, there being an elongate recessed portion extending along the length of and adjacent to said anvil portion for receiving the outer conductor which is displaced out of the plane of such three-conductor cable by said bearing surface of said first shoulder portion.

24. Apparatus as defined in claim 23 wherein said slitting assembly includes support elements for fixedly coupling said blade members to said slitting assembly.

25. Apparatus as defined in claim 23 wherein each of said blade members is symmetrically configured and comprises a slitting edge defined by a piercing point centrally located intermediate the ends of said slitting edge, said slitting edge extending contiguously from either side of said piercing point at a slight incline.

26. Apparatus as defined in claim 23 wherein said means slidably coupling said slitting assembly to said cradling means includes a pair of elongate rod-like members extending between said cradling means and the said slitting assembly.

27. Apparatus as defined in claim 26 wherein said slitting assembly comprises bearing means for slidably receiving said elongate members therethrough.

* * * * *